(12) United States Patent
Wagner (10) Patent No.: US 7,255,357 B2
(45) Date of Patent: Aug. 14, 2007

(54) METHOD AND APPARATUS FOR SUSPENDING A VEHICLE

(75) Inventor: J. Todd Wagner, East Haven, CT (US)

(73) Assignee: NC-M Chassis Systems, LLC, Plymouth, MI (US)

( * ) Notice: Subject to any disclaimer, the term of this patent is extended or adjusted under 35 U.S.C. 154(b) by 0 days.

(21) Appl. No.: 11/291,083

(22) Filed: Nov. 30, 2005

(65) Prior Publication Data
US 2006/0157951 A1    Jul. 20, 2006

Related U.S. Application Data

(63) Continuation of application No. 10/385,404, filed on Mar. 10, 2003, now abandoned.

(51) Int. Cl.
*B60G 3/20*    (2006.01)
(52) U.S. Cl. ............... 280/124.135; 280/124.107; 280/124.138; 280/124.139
(58) Field of Classification Search ......... 280/124.135, 280/124.138, 124.139, 124.14, 124.143, 280/124.106, 124.107
See application file for complete search history.

(56) References Cited

U.S. PATENT DOCUMENTS

| | | |
|---|---|---|
| 2,162,067 A | 6/1939 | Dreyer |
| 2,776,147 A | 1/1957 | Bamford |
| 3,820,812 A | 6/1974 | Stubbs et al. |
| 3,871,467 A | 3/1975 | Senft et al. |
| 3,891,232 A | 6/1975 | Flemming |
| 4,143,887 A | 3/1979 | Williams et al. |
| 4,269,432 A | 5/1981 | Hitoshi et al. |
| 4,334,693 A | 6/1982 | Huber |
| 4,406,479 A | 9/1983 | Chalmers |
| 4,456,282 A | 6/1984 | Rumpel |
| 4,573,702 A | 3/1986 | Klem |

(Continued)

FOREIGN PATENT DOCUMENTS

FR    1 123 392    8/1956

(Continued)

OTHER PUBLICATIONS

Supp. European Search Rep, Sep. 11, 2006, Wagner Engineering.

(Continued)

*Primary Examiner*—Eric Culbreth
(74) *Attorney, Agent, or Firm*—McDonald Hopkins LLC; David J. Smith; Robert H. Earp, III (57) ABSTRACT

A suspension for, and a method for suspending, a vehicle having a body is provided. The suspension includes a first suspension assembly and a second suspension assembly. The first suspension assembly extends between a first surface contact assembly and the body, and the second suspension assembly extends between a second surface contact assembly and the body. The first and second suspension assemblies each have a transverse instant center. The first suspension assembly and the second suspension assembly are aligned so that a vertical centerline of each surface contact assembly lies within a transverse vertical plane that extends therebetween. The transverse instant center of each suspension assembly is located within the transverse vertical plane, below a roll center located within the transverse vertical plane.

16 Claims, 5 Drawing Sheets

U.S. PATENT DOCUMENTS

| | | |
|---|---|---|
| 4,589,678 A | 5/1986 | Lund |
| 4,589,830 A | 5/1986 | Clawson |
| 4,616,847 A | 10/1986 | Kanai et al. |
| 4,709,935 A | 12/1987 | Takizawa et al. |
| 4,753,455 A | 6/1988 | Murakami et al. |
| 4,765,647 A | 8/1988 | Kondo et al. |
| 4,802,688 A | 2/1989 | Murakami et al. |
| 4,810,002 A | 3/1989 | Kakimoto et al. |
| 4,815,755 A | 3/1989 | Takata et al. |
| 4,865,347 A | 9/1989 | Fukushima et al. |
| 4,875,703 A | 10/1989 | Murakami |
| 4,883,287 A | 11/1989 | Murakami et al. |
| 4,927,169 A | 5/1990 | Scaduto |
| 4,934,729 A | 6/1990 | Murata et al. |
| 4,948,164 A | 8/1990 | Hano et al. |
| 5,074,582 A | 12/1991 | Parsons |
| 5,098,116 A | 3/1992 | Edahiro et al. |
| 5,114,177 A | 5/1992 | Fukunaga et al. |
| RE34,151 E | 12/1992 | Murakami et al. |
| 5,193,843 A | 3/1993 | Yamamoto et al. |
| 5,284,353 A | 2/1994 | Shinji et al. |
| 5,348,334 A | 9/1994 | Giltinan |
| 5,388,855 A | 2/1995 | Yamamoto et al. |
| 5,415,427 A | 5/1995 | Sommerer et al. |
| 5,421,606 A | 6/1995 | Chun |
| 5,498,019 A | 3/1996 | Adato |
| 5,507,510 A | 4/1996 | Kami et al. |
| 5,758,898 A | 6/1998 | Gordon et al. |
| 5,821,434 A | 10/1998 | Halliday |
| 5,839,742 A * | 11/1998 | Holt .................... 280/124.134 |
| 6,173,978 B1 | 1/2001 | Wagner |
| 6,263,991 B1 | 7/2001 | Savage et al. |
| 6,305,700 B1 | 10/2001 | Bruehl |
| 6,467,783 B1 | 10/2002 | Blondelet et al. |
| 2004/0212167 A1* | 10/2004 | Gerrard ............... 280/124.135 |

FOREIGN PATENT DOCUMENTS

| | | |
|---|---|---|
| FR | 2 040 840 | 1/1971 |
| FR | 2 451 281 | 10/1980 |
| FR | 2 616 715 | 12/1988 |
| JP | 58-48366 | * 12/1979 |
| JP | 04331622 | 11/1992 |
| JP | 10219831 | 7/1998 |
| WO | WO 00/16998 | 3/2000 |
| WO | WO 02/058949 | 8/2002 |
| WO | WO 03/074303 | 9/2003 |

OTHER PUBLICATIONS

Supp. European Search Rep Nov. 10, 2006, Wagner Engineering.

* cited by examiner

METHOD AND APPARATUS FOR SUSPENDING A VEHICLE

CROSS-REFERENCES TO RELATED APPLICATION:

This is a Continuation of U.S. patent application Ser. No. 10/385,404, filed Mar. 10, 2003 now abandoned and contains subject matter which is related to the subject matter of U.S. Pat. No. 6,173,978, issued Jan. 16, 2001, U.S. Pat. No. 6,550,797, issued Apr. 22, 2003 and U.S. patent application Ser. No. 10/152,083, filed on May 20, 2002, each of which are hereby incorporated by reference in their entireties.

BACKGROUND OF THE INVENTION

1. Technical Field

This invention relates to vehicle suspensions in general, and to vehicular suspensions having vehicle roll and pitch control mechanisms, in particular.

2. Background Information

The suspension of a vehicle determines the ride characteristics of the vehicle such as its roll and pitch. The term "roll" refers to rotational movement of the vehicle body about a longitudinal axis of the vehicle. Roll is typically encountered during cornering. The term "pitch" refers to rotational movement of the vehicle body about a widthwise axis of the vehicle. Pitch is typically encountered during acceleration (acceleration "squat") and during braking (braking "dive").

Vehicle suspension systems can be characterized as either active or passive. "Active" suspension systems typically adjust suspension elements during use in response to sensed operating conditions. Active suspension systems are often relatively complex, prohibitively expensive, or both. Passive suspension systems, on the other hand, typically include anti-roll or stabilizer bars, or the like that cannot be adjusted during use. Passive suspension systems are typically relatively simple and affordable.

In passive suspension systems that utilize elements such as springs and anti-roll bars to reduce cornering roll, there is a trade-off between reduction in roll and the smoothness of the ride. Spring and shock rates that increase the smoothness of the ride often counteract the effect of conventional anti-roll devices. Moreover, such anti-roll devices do not compensate for variations in weight distribution of the vehicle that can also significantly affect rolling characteristics.

What is needed, therefore, is a vehicular suspension system that provides favorable roll and pitch characteristics.

DISCLOSURE OF THE INVENTION

It is, therefore, an object to provide a vehicular suspension system that provides favorable roll and pitch characteristics.

According to the present invention, a suspension for a vehicle having a body is provided. The suspension includes a first suspension assembly and a second suspension assembly. The first suspension assembly extends between a first surface contact assembly and the body, and the second suspension assembly extends between a second surface contact assembly and the body. The first and second suspension assemblies each have a transverse instant center. The first suspension assembly and the second suspension assembly are aligned so that a vertical centerline of each surface contact assembly lies within a vertical plane that extends therebetween. The transverse instant center of each suspension assembly is located within the vertical plane, below a roll center located within the vertical plane.

According to a further aspect of the invention, a method for suspending a vehicle having a body is provided that includes the steps of: (1) providing a first suspension assembly that extends between a first surface contact assembly and the body, wherein the first suspension assembly includes a transverse instant center; (2) providing a second suspension assembly that extends between a second surface contact assembly and the body, wherein the second suspension assembly includes a transverse instant center; (3) aligning the first surface contact assembly and the second surface contact assembly so that a vertical centerline of each surface contact assembly lies within a vertical plane that extends therebetween; and (4) positioning the first suspension assembly and the second suspension assembly so that the transverse instant center of each suspension assembly is located within the vertical plane, vertically below a roll center located within the vertical plane.

The term "vehicle" as used herein includes, but is not limited to, wheeled all-terrain vehicles, snowmobiles, hydroplanes, tracked vehicles, and vehicles that travel on rails. The vehicle may be self-propelled (e.g., a snowmobile) or may be non-propelled (e.g., a rail car). The term "surface contact assembly" as used herein refers to the assembly that contacts the ground or water and extends upward to the vehicle suspension. An automobile wheel assembly, an all-terrain vehicle wheel assembly, a snowmobile ski assembly, a hydroplane ski assembly, and a track assembly of a tracked vehicle are all examples of surface contact assemblies that can be used with the present invention.

An advantage of the present invention is that it is possible to create a relatively high and stable roll center, and therefore a desirable stable vehicular suspension. The relatively high roll center can be maintained in approximately the same position during expected motion of the vehicle.

These and other objects, features, and advantages of the present invention will become apparent in light of the drawings and detailed description of the present invention provided below.

BRIEF DESCRIPTION OF THE DRAWINGS

FIGS. 12-14 are diagrams illustrating Ackermann steering geometry between the front wheels of a vehicle.

DETAILED DESCRIPTION OF THE INVENTION

Figure 1:
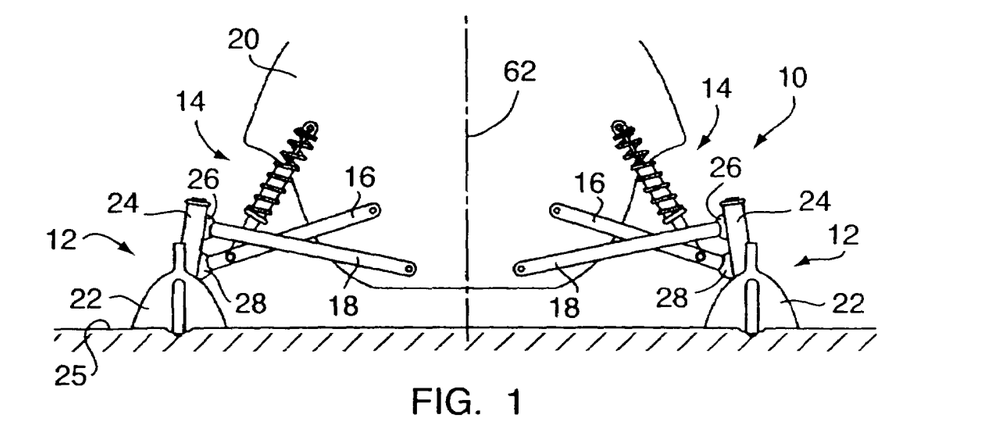
FIG. 1 is a diagrammatic front view of vehicle (e.g., a snowmobile) having the present invention suspension.
Figure 2:
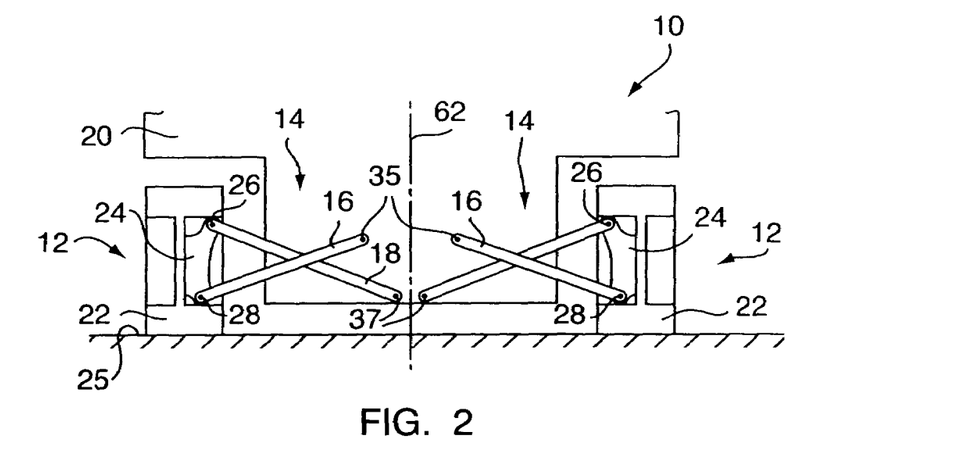
FIG. 2 is a diagrammatic front view of vehicle (e.g., an all-terrain vehicle) having the present invention suspension.
Figure 3:
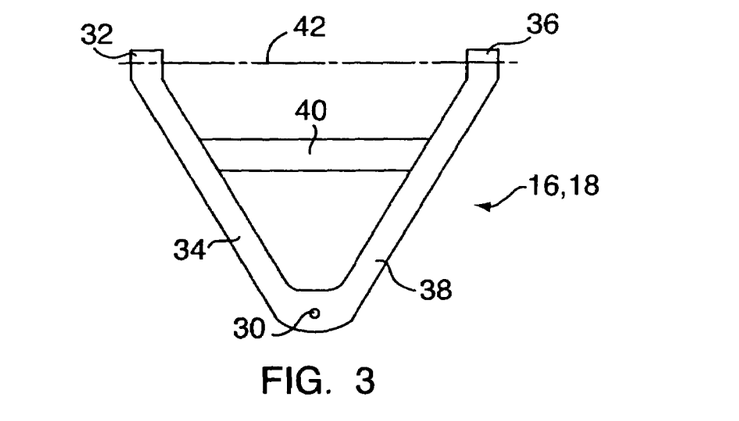
FIG. 3 is a diagrammatic view of a support arm.

Referring to FIGS. 1-3, a vehicular suspension 10 is described herein that can be used on a wide variety of different vehicular applications; e.g., automobiles, trucks, all-terrain vehicles, snowmobiles, hydroplanes, tracked vehicles, rail cars, etc. The suspension 10 is used with independently suspended surface contact assemblies 12. To simplify the description herein, unless otherwise specified the term "surface contact assembly" as used herein shall be defined as including, but not limited to, a ski mount assembly of a snowmobile and/or that of a hydroplane, a wheel mount assembly of a vehicle on wheels, a roller mount assembly for a tracked vehicle, or the like. The surface contact assembly 12 may be driven or non-driven.

The present vehicular suspension 10 includes a one or more suspension assemblies 14, each having a pair of support arms 16,18 extending between the body 20 of the vehicle and the surface contact assembly 12. The terms "vehicle body" or "body of the vehicle" as used herein are defined as including the frame and chassis components attached thereto. The exact frame and chassis arrangement will vary depending on the application; e.g., snowmobile, ATV, etc. The present invention suspension 10 contemplates and is useful with all of these different types of vehicle bodies, and is not therefore limited to use with any one of the above.

The elements of a surface contact assembly 12 will vary depending on the vehicular application, and in some instances the elements will also depend on the position of the surface contact assembly on the vehicle (e.g., front, rear, etc.). The surface contact assembly can be generally described as including a surface member 22 and a spindle 24. The term "surface member" as used herein refers to a structure (e.g., a wheel or ski) which directly contacts the surface 25 over which the vehicle is traveling, or a structure (e.g., a wheel or a roller used with an endless track) that indirectly contacts the surface 25 over which the vehicle is traveling. The term "spindle" as used herein refers to a structure on which a wheel or roller is rotatably mounted, or on which a ski is pivotally mounted. The surface member 22 is mounted on the spindle 24. The spindle 24 includes an upper spindle joint 26 and a lower spindle joint 28. The type of each upper and lower spindle joint 26,28 is chosen to suit the application. Examples of acceptable types of spindle joints 26,28 include, but are not limited to, ball joints, compliant bushings, heim joints, etc.

Referring to FIG. 3, each support arm 16,18 includes a spindle mount 30, a first body mount 32, a first member 34, a second body mount 36, and a second member 38. The first member 34 extends between the spindle mount 30 and the first body mount 32. The second member 38 extends between the spindle mount 30 and the second body mount 36. Some embodiments further include one or more lateral members 40 extending between the first and second members 34,38 to increase the rigidity of the support arm 16,18 and/or to provide an attachment point for additional suspension members (e.g., springs, shocks, etc.). The support arm 16,18 is pivotally attached to the vehicle body at the first and second body mounts 32,36. In some instances, one or both body mounts 32,36 include a pliable bushing that provides a limited amount of motion in addition to rotational motion around a pivot axis extending between the body mounts (hereinafter referred to as a "body mount line 42"). The spindle mount 30 and the body mounts 32,36 in each support arm 16,18 define a plane. The first and second members 34,38 (and the lateral member(s) 40 if present) are not necessarily disposed in the plane of the support arm 16,18 of which they are a part, although they can be in some applications. The exact geometry of the first and second member 32,36 (and lateral member(s)) will vary to accommodate the application at hand.

The pair of support arms 16,18 extending between the body 20 of the vehicle and the surface contact assembly 12 are arranged vis-à-vis the body 20 and the surface contact assembly 12 such that one of the support arms 16 extends between the lower spindle joint 28 and a pair of upper body mounts 32,36 (collectively referred to in FIGS. 1 and 2 by reference numeral 35), and the other support arm 18 extends between the upper spindle joint 26 and a pair of lower body mounts (collectively referred to in FIGS. 1 and 2 by reference numeral 37). The upper body mounts 35 are disposed vertically above, but not necessarily aligned with, the lower body mounts 37 when the surface member 22 is in contact with or proximate the surface 25. The members 34,38 of one of the support arms 16,18 are received between the members 34,38 of the other support arm 18,16. Hence, the support arms 16,18 may be described as crossing one another in an "X" shaped arrangement, without normally touching one another.

The support arms 16,18 described above represent a preferred embodiment of the present invention, but do not represent all the possible embodiments of support arms 16,18. In alternative embodiments, one or both of the support arms 16,18 can be replaced with independent links that extend along paths similar to those of the above-described support arms 16,18; e.g., a pair of independent links, each including a spindle mount 30 on one end and a body mount 32,36 on the opposite end. Independent links can be used in place of one or both of the support arms 16,18. The independent links may be connected to one another by a lateral member(s) 40.

Figure 4:
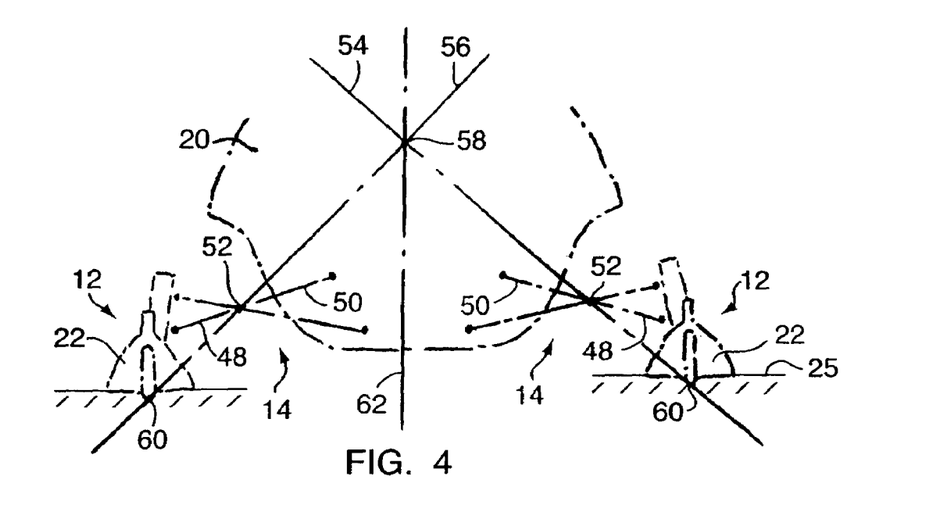
FIG. 4 is a diagram that illustrates the relationship of the support arm planes within a vertical transverse (or "widthwise") extending plane passing through the vertical centerline of the surface contact assemblies, shown in the form of ski mount assemblies.
Figure 5:
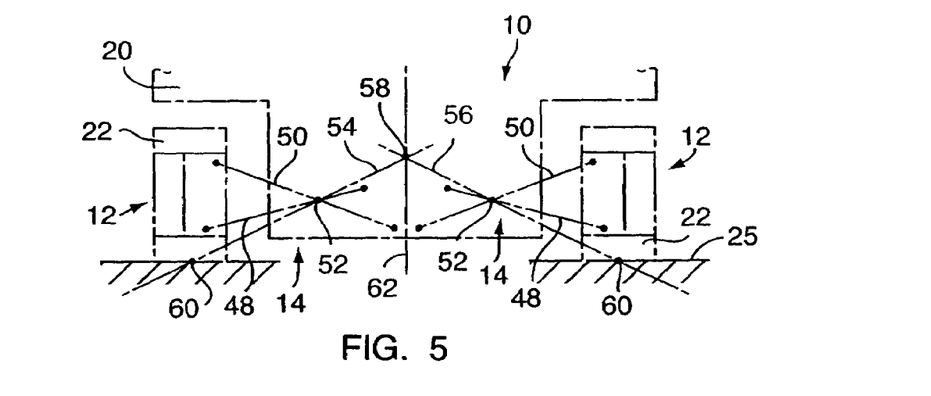
FIG. 5 is a diagram that illustrates the relationship of the support arm planes within a vertical transverse (or "widthwise") extending plane passing through the vertical centerline of the surface contact assemblies, shown in the form of wheel mount assemblies.
Figure 6:
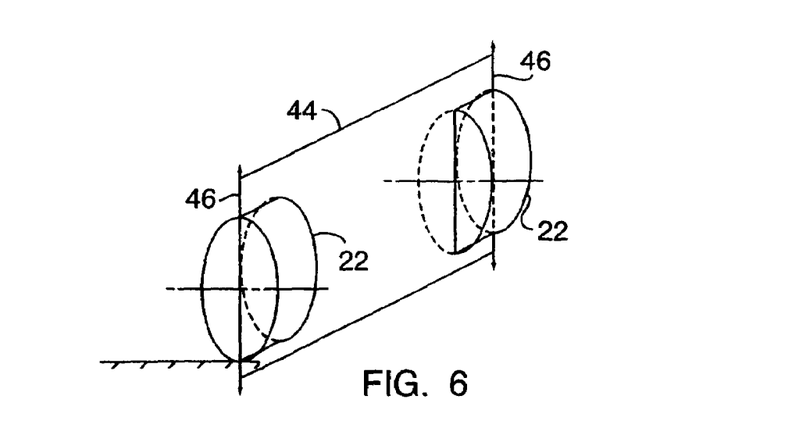
FIG. 6 is a diagram showing relative plane positioning.

FIGS. 4 and 5 each show a diagram representing a suspension 10 (see FIGS. 1 and 2) having a pair of symmetrically arranged suspension assemblies 14, each having a surface contact assembly 12 disposed on a side of the vehicle body 20. In the embodiment shown in FIG. 4, the surface contact assemblies 12 are shown in the form of a ski mount assembly, and in FIG. 5 the surface contact assemblies 12 are shown as a wheel or roller mount assembly. The diagrams are shown along a vertical plane 44 (see FIG. 6) that passes through the vertical centerlines 46 of both surface contact assemblies 12 and surface members 22. FIG. 6 shows the aforesaid vertical plane 44 in a perspective view to better illustrate the position of the plane 44 relative to the surface contact assemblies 12 and surface members 22 (each depicted as a wheel). The lines 48, 50 formed at the intersection of each support arm plane with the vertical plane 44 are shown in FIGS. 4 and 5. Note that the support arm plane intersection lines 48,50 cross one another in each suspension when viewed in this plane. The intersection point of the lines is defined as the transverse instant center (IC) 52 for the front elevation view of that suspension assembly 14. FIGS. 4 and 5 also show a pair of lines 54,56 that intersect at the roll center 58 of the vehicle body 20. One line 54 passes through the center 60 of an area where the surface member 22 is in contact with the surface 25 (hereinafter referred to as the "contact patch" of the surface member), and the transverse IC 52 on one side of the vehicle body 20. The other line 56 passes through the center 60 of the surface member contact patch and the transverse IC 52 on the opposite side of the vehicle body 20.

The vertical position of the roll center 58 relative to the center of gravity of the vehicle body 20 is significant because it affects the roll of the vehicle. The position of the roll center 58 can be adjusted by altering the relative positioning of the support arms 16,18 on either or both sides of the vehicle, and thereby alter the position of the longitudinal IC 52 which is defined by the planes of the support arms 16,18. An advantage provided by the present suspension is that it is possible to create a relatively high and stable roll center 58; i.e., a relatively high roll center than can be maintained in approximately the same position during expected motion of the vehicle. It should also be noted that the roll center 58 shown in FIGS. 4 and 5 is intersected by the vertical centerline 62 of the vehicle body 20. The roll center 58 intersects the centerline 62 because the suspension assemblies 14 on each side of the vehicle body 20 are symmetrical with one another. The roll center 58 can be moved to one side of the vehicle centerline 62 by making the suspension assemblies 14 non-symmetrical. The roll center 58 is described above at rest under normal loading conditions. The roll center 58 can move to either side of the vehicle centerline 62 under certain loading or body movement conditions.

Figure 7:
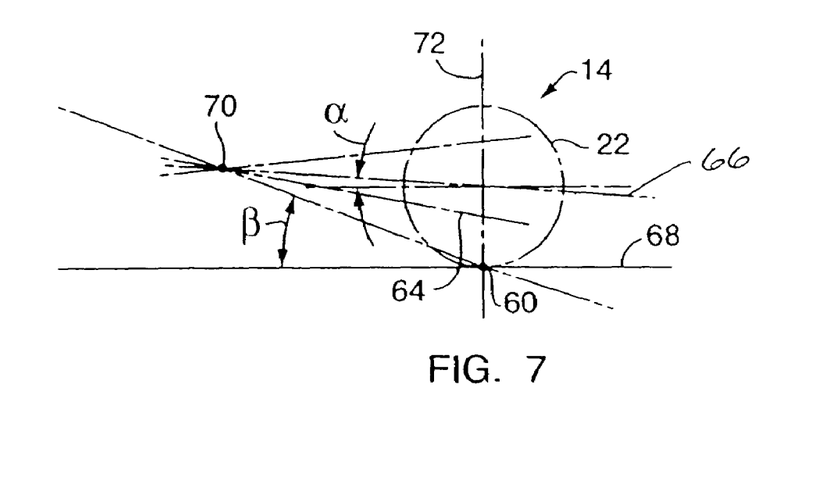
FIG. 7 is a side view diagram of the present suspension that illustrates the relationship of the support arm planes within a longitudinally extending plane passing through the vertical centerline of the wheel.

Referring to FIG. 7, the orientation of the support arm planes within a suspension assembly 14 also has important implications relative to other suspension parameters such as anti-dive, anti-squat, and anti-lift; i.e., suspension characteristics in the fore and aft direction of the vehicle (also referred to as "pitch"). FIG. 7 diagrammatically shows a side-view of a surface contact assembly 12. The view is shown along a longitudinally extending vertical plane that passes through the centerline of the surface member 22. The surface member 22 outline is shown in phantom in FIG. 7 (in the form of a wheel or roller) to locate the other elements of the figure. The lines 64,66 formed by the intersection of the support arm planes with the plane passing through the centerline of the surface member 22 on that side of the vehicle body 20, illustrate an embodiment where the support arm planes are not parallel to a horizontal plane 68. The lines 64,66 can be extended to a convergence point 70 that is the instant center of the suspension assembly in the side view (i.e., the "longitudinal IC"). Stated differently, the support arms 16,18 can be mounted in a position such that the lines 64,66 of the support arm planes are skewed toward one another to create the aforesaid convergence point 70. A line extending between the longitudinal IC 70 and the center of the surface member contact patch 60 forms an angle β with a horizontally extending plane 68 containing the surface member contact patch 60. The tangent of the angle β is directly related to the anti-dive of the vehicle surface contact assembly 12 being considered. Increasing or decreasing the magnitude of the angle β enables the adjustment of the anti-dive to be suited to the application. A line extending between the longitudinal IC 70 and the center of the surface member 22 forms an angle α with a horizontally extending plane 68 passing through the center of the surface member 22. The tangent of the angle β is directly related to the anti-lift and anti-squat of the vehicle surface contact assembly 12 being considered. Increasing or decreasing the magnitude of the angle β enables the adjustment of the anti-lift and anti-squat to be suited to the application. The present suspension 10 facilitates the positioning of the convergence point 70 vertically and horizontally and thereby enables the use of a variety of advantageous β angle's for various vehicular applications. The convergence point 70 can also be positionally described in terms of a side view swing arm (SVSA) height and length. The SVSA height represents either: 1) the difference in vertical distance between the horizontal plane 68 and the longitudinal IC 70; or 2) the difference in vertical distance between a horizontal plane passing through the centerline of the surface member 22 and the longitudinal IC 70. Which SVSA height is appropriate depends on the position of the surface contact assembly 12, whether it is driven, etc. The methodology to determine which is used is known and will therefore not be discussed further herein. The SVSA length is the distance between the vertical centerline 72 of the surface contact assembly 12 and the longitudinal IC 70.

Figure 8:
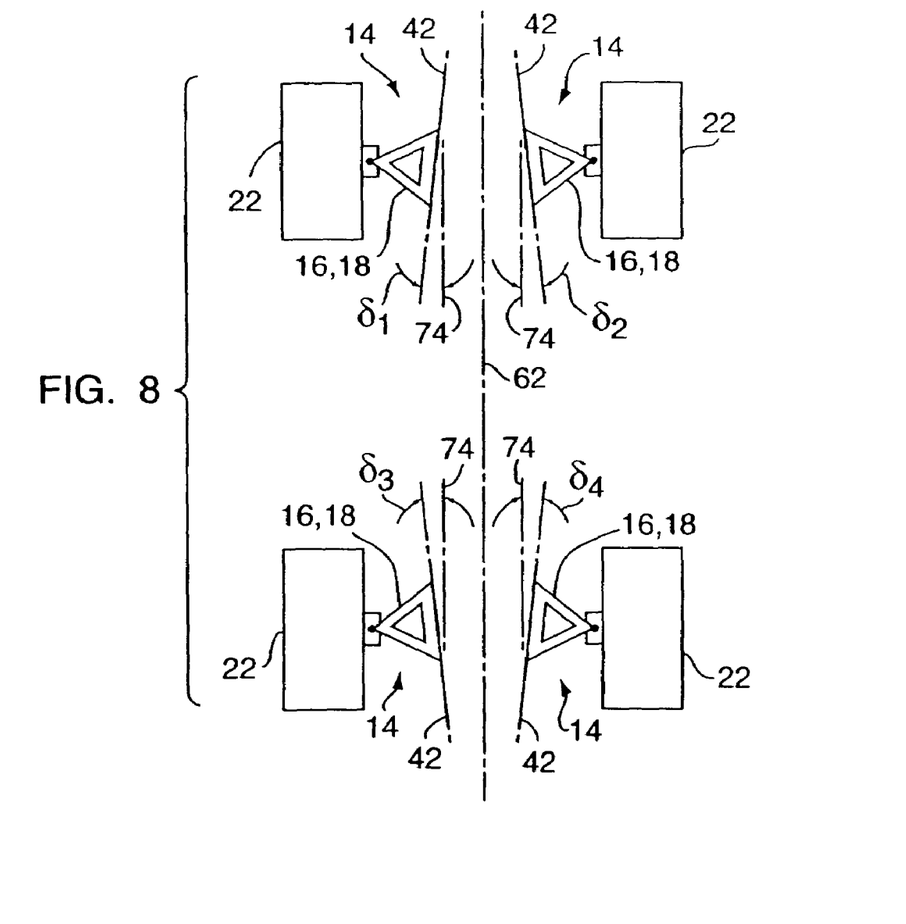
FIG. 8 is a diagrammatic top view of a vehicle illustrating the orientation of the body mount lines of the present suspension relative to a longitudinally extending line.

Referring to FIG. 8, each support arm 16,18 can be skewed from the longitudinally extending vertical axis 62 by an angle δ. The angle δ is defined as the angle between a line 42 extending between the body mounts of a support arm (described above as body mount line 42) and the longitudinally extending vertical axis 62 of the vehicle. FIG. 8 diagrammatically shows the suspension assemblies of a wheeled vehicle (e.g., an ATV, a tracked vehicle, etc.) in a horizontal plane to illustrate the angle δ extending between the body mount lines 42 of each suspension assembly 14 and a longitudinally extending line 74 parallel to the axis 62. The suspension assemblies 14 shown in FIG. 8 are all equally skewed by the angle δ (i.e., $\delta_1=\delta_2=\delta_3=\delta_4$). The exact amount of skew can vary to suit the application at hand and need not be similar between suspension assemblies 14; e.g., front and rear wheel suspension assemblies 14 can have different skew angles (e.g., $\delta_1=\delta_2$, $\delta_2\neq\delta_4$, $\delta_3=\delta_4$), or suspension assemblies 14 on opposite sides can have different skew angles (e.g., $\delta_1\neq\delta_2$, $\delta_1=\delta_3$, $\delta_2=\delta_4$). The ability of the present suspension 10 to have suspension assemblies 14 skewed from the longitudinally extending vertical axis 62 of the vehicle makes it advantageously adaptable to a variety of vehicular applications.

Figure 9:
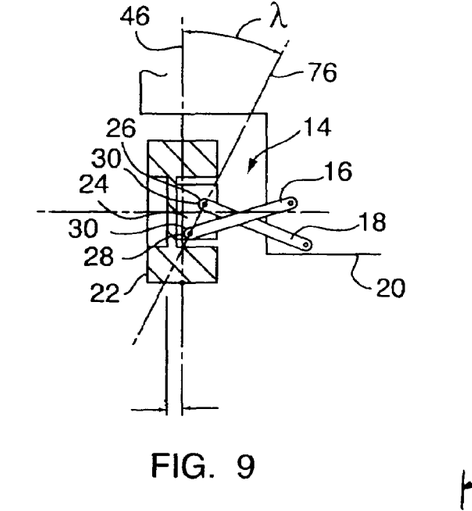
FIG. 9 is a diagrammatic view of the present suspension illustrating the position of the spindle joints and mounts relative to the surface contact assembly.

Referring to FIG. 9, the crossed orientation of the support arms 16,18 within the present suspension assemblies 14 facilitates positioning the spindle joints 26,28 and spindle mounts 30 relative to the surface member 22. A line 76 extending between the spindle joints 26,28 is referred to herein as the kingpin axis 76. As can be seen in FIG. 9, the kingpin axis 76 passing through the spindle joints 26,28 and spindle mounts 30 forms an angle k relative to the vertical centerline 46 of the surface member 22. In some instances, the kingpin axis 76 may be parallel to the vertical centerline 46 of the surface member 22 (zero degree angle −0°). In other instances, the angle between the kingpin axis 76 and the vertical centerline 46 is greater than zero and the kingpin axis 76 can therefore be described as extending toward (or away from) the vertical centerline 46. The angle of the kingpin axis 76 relative to the vertical centerline 46 and the position where the kingpin axis 76 intersects the vertical centerline 46 are both significant because of the effects they have relative to the scrub radius of the surface member 22 and the length of the spindle 24. The crossed orientation of the support arms 16,18 within the present suspension enables the spindle mounts 30 and spindle joints 26, 28 to be positioned relatively close to the vertical centerline 46 of the surface member.

Figure 10:
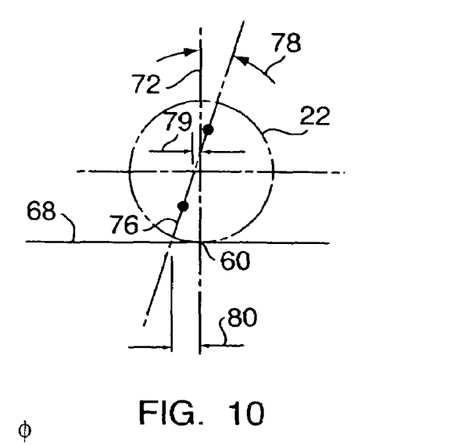
FIG. 10 is a diagram that illustrates the relationship of the kingpin axis and the wheel assembly so that the positionability of the kingpin axis possible with the present suspension can be fully appreciated.

Referring to FIG. 10, the crossed orientation of the support arms 16,18 within the present suspension assemblies 14 also provides favorable positionability of the spindle joints 26,28 and spindle mounts 30 vis-a-vis the caster angle 78, the kingpin offset 79, and the trail 80 of the kingpin axis 76. The caster angle 78 refers to the angle between the kingpin axis 76 relative to the vertical centerline 72 of the surface member 22 in the side view of the surface contact assembly 12. The kingpin offset 79 is the distance between the vertical side view centerline 72 and the point where kingpin axis 76 intersects a horizontally extending line passing through the center of the surface member 22. The trail 80 refers to the distance between the vertical centerline 72 of the surface member 22 and the point of intersection between the kingpin axis 76 and the horizontal plane 68 containing the surface member contact patch 60.

Figure 11:
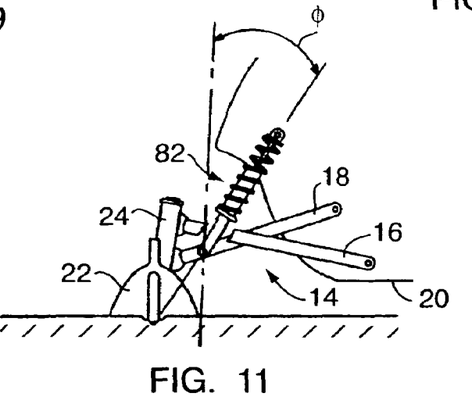
FIG. 11 is a diagrammatic view of an embodiment of the present suspension that includes a spring assembly.

Referring to FIG. 11, the present suspension assemblies 14 utilize a spring assembly 82 that extends between, and is pivotally attached to, one of the support arms 16,18 (or other portion of the surface contact assembly 12, e.g., the spindle 24) and the vehicle body 20. FIG. 11 shows the spring assembly 82 attached to the support arm 16 that is pivotally attached to the lower spindle joint 28, but in alternative embodiments the spring assembly 82 could be attached to the other support arm 18 (or other portion of the spring contact assembly 12). A variety of spring assemblies can be utilized with the present invention and consequently the present invention is not limited to any particular spring assembly 82. A torsion bar (not shown) may be used with, or in place of, a spring assembly 82. The spring assembly 82 is mounted so that the assembly is skewed at an angle φ from vertical when the surface member 22 is a normal ride height.

Figure 12:
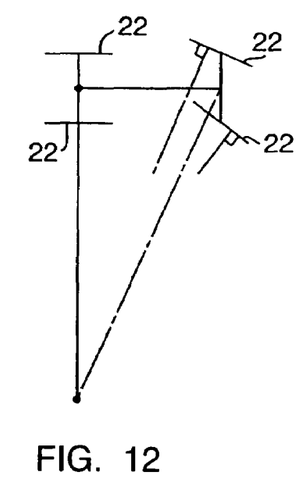
FIG. 12 shows wheels having Ackermann.
Figure 13:
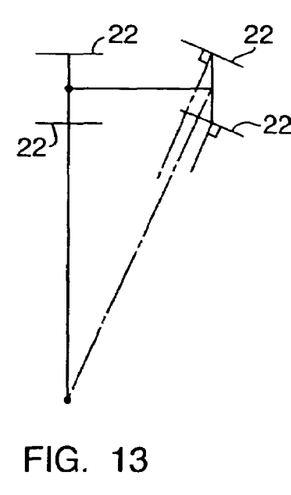
FIG. 13 shows wheels having "neutral" Ackermann (also referred to as parallel orientation)
Figure 14:
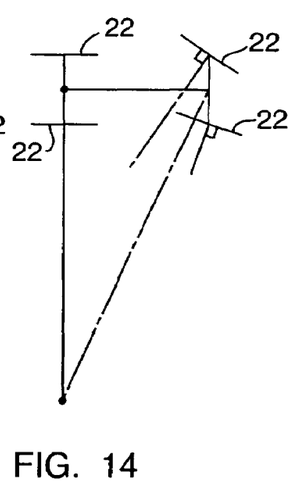
FIG. 14 shows wheels having reverse Ackermann.

Referring to FIGS. 12-14, it is known to use Ackermann to account for the difference in turning radius between the surface member 22 (shown diagrammatically) disposed along the inner radius track in a turn and the surface member 22 disposed along the outer radius track. It is also known that turning can produce lift on the vehicle body 20. The amount of Ackermann created by the front suspension when the steering is turned can be used to counteract the lift produced on the vehicle body 20 during the turn. For example, increasing the Ackermann can produce anti-lift. The support arms 16,18 of the present suspension assemblies 14 facilitate the creation of Ackermann because of their positionability relative to the vehicle body 20.

Referring to FIGS. 15-18, an embodiment of the present suspension 10 is shown extending between the body 20 of the vehicle and a surface contact assembly in the form of an axle assembly 84. The axle assembly 84 includes a plurality of flanges 86 attached to an axle housing 88. In terms of the above description, the flanges 86 attached to the axle housing 88 function as a part of a spindle assembly, since a wheel 22 (i.e., "surface member") is rotatably mounted on each end of the axle assembly 84. The plurality of flanges 86 include one or more upper flange joints 90 and one or more lower flange joints 92.

Figure 15:
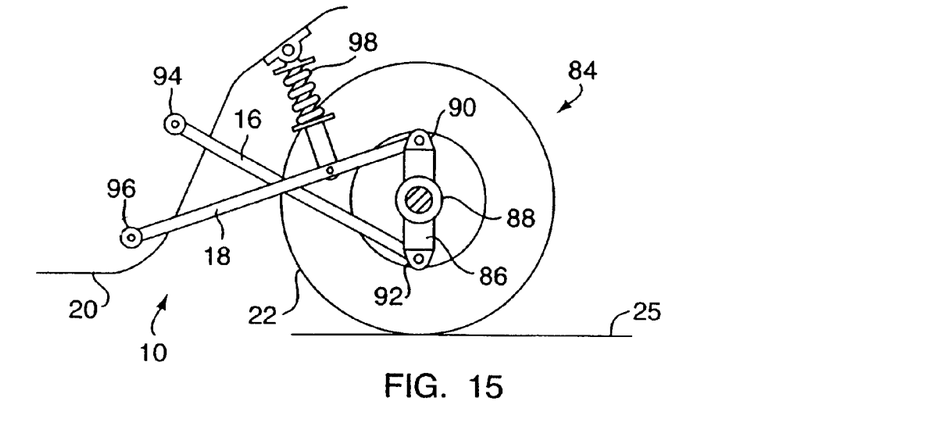
FIG. 15 is a diagrammatic side view of an embodiment of the present suspension.
Figure 16:
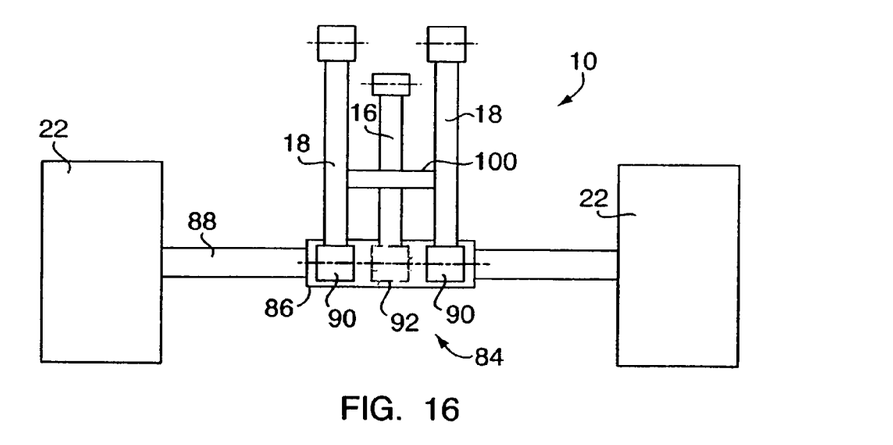
FIG. 16 is a diagrammatic top view of an embodiment of the present
Figure 17:
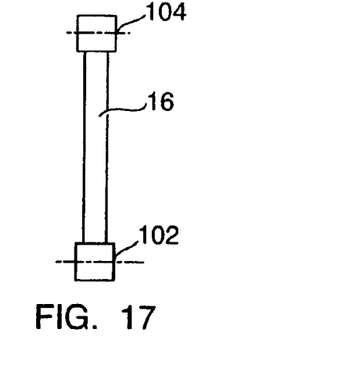
FIG. 17 is a diagrammatic view of an independent link embodiment of a support arm.
Figure 18:
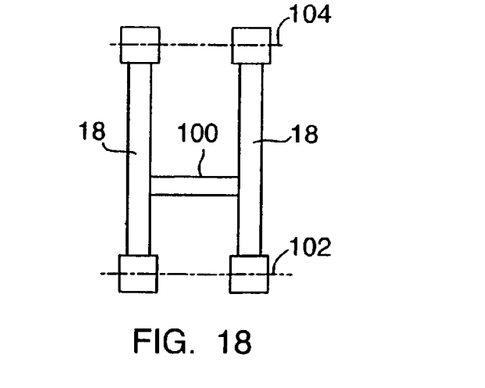
FIG. 18 is a diagrammatric view of an embodiment of the support arm that includes a pair of independent links connected by a lateral member.

The suspension includes one or more first support arms 16 and one or more second support arms 18, extending between the body 20 of the vehicle and the axle assembly 84. The first support arm is shown as a single independent link, and the second support arm is shown as a pair of independent links connected by a lateral member 100. In the embodiment shown in FIGS. 15 and 16, the support arms 16,18 are arranged vis-à-vis the body 20 and the axle assembly 84 such that the first support arm 16 extends between a lower flange joint 92 and an upper body mount 94. The second support arms 18 extend between a pair of upper flange joints 90 and a pair of lower body mounts 96. The upper body mounts 94 are disposed vertically above, but not necessarily aligned with, the lower body mounts 96 when the surface member 22 is in contact with or proximate the surface 25. The first support arm 16 is received between the second support arms 18. Hence, the support arms 16,18 may be described as crossing one another in an "X" shaped arrangement when viewed horizontally (e.g., the side view shown in FIG. 15), without normally touching one another. FIG. 15 also diagrammatically shows a spring assembly 98 extending between a second support arm 18 and the body 20. A spring assembly 98 may extend between each second support arm 18 and the body 20, or between the body 20 and the lateral member 100 attached to the second support arms 18. In alternative embodiments, a spring assembly 98 can be disposed between the first support arm 16 and the body 20 in combination with or in place of the spring assembly(ies) 98 extending between the second support arm(s) and the body 20. In a further alternative embodiment, one or more spring assemblies may extend between the axle assembly 84 (e.g., flanges 86) and the body 20. As indicated above, the flanges 86, attached to the axle housing 88, function as a spindle in this embodiment.

Although this invention has been shown and described with respect to the detailed embodiments thereof, it will be understood by those skilled in the art that various changes in form and detail thereof may be made without departing from the spirit and scope of the invention. For example, FIGS. 1 and 2 show a diagrammatic front view of a vehicle having a pair of the present suspension assemblies 14. The support arms 16,18 of those suspension assemblies 14 are symmetrical and do not cross the centerline 62 of the vehicle. In alternative embodiments, the support arms 16,18 of one or both suspension assemblies may cross the centerline 62, and potentially cross each other. Extending the support arms 16,18 can provide favorable camber characteristics for a surface contact assembly 12. In addition, the Detailed Description above describes the use of a single suspension assembly 14 with a surface contact assembly 12. In alternative embodiments, a plurality of suspension assemblies 14 can be utilized with a surface contact assembly 12. In addition, some suspension assemblies 14 may also include non-crossing links to add additional stiffness, strength, and positional control.

What is claimed is:

1. A suspension for a vehicle having a body, the suspension comprising:
    a first suspension assembly that extends between a first surface contact assembly and the body, wherein the first suspension assembly includes a transverse instant center;

a second suspension assembly that extends between a second surface contact assembly and the body, wherein the second suspension assembly includes a transverse instant center;

wherein the first suspension assembly and the second suspension assembly are aligned so that a vertical centerline of each surface contact assembly lies within a transverse vertical plane that extends therebetween;

wherein the transverse instant center of each suspension assembly is located within the transverse vertical plane, below a roll center located within the transverse vertical plane;

wherein the first suspension assembly and the second suspension assembly each comprise:
  a first support arm having a first spindle mount and a pair of first body mounts, wherein a first support arm plane is defined by the first spindle mount and the first body mounts;
  a second support arm having a second spindle mount and a pair of second body mounts, wherein a second support arm plane is defined by the second spindle mount and the second body mounts; and
  wherein the first support arm and the second support arm are positioned such that the first support arm plane intersects the transverse vertical plane along a first line, and
the second support arm plane intersects the transverse vertical plane along a second line,
and the first line and second line cross each other at the transverse instant center;

wherein each suspension assembly supports a surface member that has a contact patch with a center, and wherein the roll center is located within the transverse vertical plane at an intersection of a third line and a fourth line;

wherein the third line extends through the center of the contact patch of the surface member supported by the first suspension assembly and the transverse instant center of the first suspension assembly; and wherein the fourth line extends through the center of the contact patch of the surface member supported by the second suspension assembly and the transverse instant center of the second suspension assembly.

2. The suspension of claim 1 wherein the first support arm comprises:
  a first member that extends between the first spindle mount and one of the first body mounts; and
  a second member that extends between the first spindle mount and the other of the first body mounts.

3. The suspension of claim 2, wherein the first support arm further comprises a lateral member extending between the first member and the second member.

4. The suspension of claim 1, wherein the second support arm comprises:
  a first member that extends between the second spindle mount and one of the second body mounts; and
  a second member that extends between the second spindle mount and the other of the second body mounts.

5. The suspension of claim 4, wherein the second support arm further comprises a lateral member extending between the first member and the second member.

6. The suspension of claim 1, wherein a first surface contact assembly mount line extends through the first spindle mount and the second spindle mount within the first suspension assembly, and a second surface contact assembly mount line extends through the first spindle mount and the second spindle mount within the second suspension assembly;
  wherein at least one of the first mount line and the second mount line is skewed from a vertical centerline of a surface member attached to the respective first suspension assembly and second suspension assembly.

7. The suspension of claim 1, wherein the first contact assembly and the second contact assembly are ski mount assemblies.

8. The suspension of claim 1, wherein the first contact assembly and the second contact assembly are wheel mount assemblies.

9. A suspension for a vehicle having a body, the suspension comprising:
  a first suspension assembly that extends between a first surface contact assembly and the body, wherein the first suspension assembly includes a transverse instant center;
  a second suspension assembly that extends between a second surface contact assembly and the body, wherein the second suspension assembly includes a transverse instant center;
  wherein the first suspension assembly and the second suspension assembly are aligned so that a vertical centerline of each surface contact assembly lies within a transverse vertical plane that extends therebetween;
  wherein the transverse instant center of each suspension assembly is located within the transverse vertical plane, below a roll center located within the transverse vertical plane;
  wherein the first suspension assembly and the second suspension assembly each comprise:
    a first support arm having a first spindle mount and a pair of first body mounts, wherein a first support arm plane is defined by the first spindle mount and the first body mounts;
    a second support arm having a second spindle mount and a pair of second body mounts, wherein a second support arm plane is defined by the second spindle mount and the second body mounts; and
    wherein the first support arm and the second support arm are positioned such that the first support arm plane intersects the transverse vertical plane along a first line, and the second support arm plane intersects the transverse vertical plane along a second line, and the first line and second line cross each other at the transverse instant center;
  wherein a first body mount line extends through the pair of first body mounts and a second body mount line extends through the pair of second body mounts; and
  wherein the first body mounts are attached to the body such that the first body mount line is skewed by a first angle from a longitudinally extending centerline of the vehicle.

10. The suspension of claim 9, wherein the second body mounts are attached to the body such that the second body mount line is skewed by a second angle from the longitudinally extending centerline of the vehicle.

11. The suspension of claim 10, wherein the first angle and the second angle are equal.

12. A method for suspending a vehicle having a body, comprising the steps of:
  providing a first suspension assembly that extends between a first surface contact assembly and the body, wherein the first suspension assembly includes a transverse instant center;

providing a second suspension assembly that extends between a second surface contact assembly and the body, wherein the second suspension assembly includes a transverse instant center;

aligning the first surface contact assembly and the second surface contact assembly so that a vertical centerline of each surface contact assembly lies within a transverse vertical plane that extends therebetween;

positioning the first suspension assembly and the second suspension assembly so that the transverse instant center of each suspension assembly is located within the transverse vertical plane, vertically below a roll center located within the transverse vertical plane;

wherein a first body mount line extends through the pair of first body mounts and a second body mount line extends through the pair of second body mounts; and attaching the first body mounts to the body such that the first body mount line is skewed by a first angle from a longitudinally extending centerline of the vehicle.

13. The method of claim 12, wherein the first suspension assembly and the second suspension assembly each comprise:

a first support arm having a first spindle mount and a pair of first body mounts, wherein a first support arm plane is defined by the first spindle mount and the first body mounts;

a second support arm having a second spindle mount and a pair of second body mounts, wherein a second support arm plane is defined by the second spindle mount and the second body mounts;

wherein the first support arm and the second support arm are positioned such that the first support arm plane intersects the transverse vertical plane along a first line, and the second support arm plane intersects the transverse vertical plane along a second line, and the first line and second line cross each other at the transverse instant center.

14. The method of claim 12, further comprising the steps of:

providing a surface member on each suspension assembly, wherein the surface member has a contact patch with a center, and wherein the roll center is located within the transverse vertical plane at an intersection of a third line and a fourth line;

wherein the third line extends through the center of the contact patch of the surface member supported by a first ground contact assembly and the transverse instant center of the first suspension assembly; and wherein the fourth line extends through the center of the contact patch of the surface member supported by the a second ground contact assembly and the transverse instant center of the second suspension assembly.

15. The method of claim 12, further comprising the step of:

attaching the second body mounts to the body such that the second body mount line is skewed by a second angle from the longitudinally extending centerline of the vehicle.

16. The method of claim 12, further comprising:

wherein a first ground contact assembly mount line extends through the first spindle mount and the second spindle mount of the first suspension assembly, and a second ground contact assembly mount line extends through the first spindle mount and the second spindle mount of the second suspension assembly;

skewing at least one of the first ground contact assembly mount line and the second ground contact assembly mount line from a vertical centerline of a surface member attached to the respective first ground contact assembly and second ground contact assembly.

* * * * *

UNITED STATES PATENT AND TRADEMARK OFFICE
CERTIFICATE OF CORRECTION

| | | |
|---|---|---|
| PATENT NO. | : 7,255,357 B2 | Page 1 of 1 |
| APPLICATION NO. | : 11/291083 | |
| DATED | : August 14, 2007 | |
| INVENTOR(S) | : J. Todd Wagner | |

It is certified that error appears in the above-identified patent and that said Letters Patent is hereby corrected as shown below:

Column 6, line 14, delete "β" and insert --a--
Column 6, line 17, delete "β" and insert --a--
Column 6, line 66, delete "k" and "λ"
Column 12, line 14, delete "the" after "by"

Signed and Sealed this

Fourth Day of December, 2007

JON W. DUDAS
*Director of the United States Patent and Trademark Office*